United States Patent [19]
Dominke et al.

[11] Patent Number: 5,991,669
[45] Date of Patent: Nov. 23, 1999

[54] METHOD AND ARRANGEMENT FOR CONTROLLING A VEHICLE

[75] Inventors: Peter Dominke, Bietigheim-Bissingen; Holger Bellmann, Ludwigsburg; Jens-Olaf Mueller, Leonberg; Torsten Bertram, Duesseldorf; Asmus Volkart, Bietigheim-Bissingen; Christian Grosse, Kornwestheim; Wolfgang Hermsen, Rodgau, all of Germany

[73] Assignee: Robert Bosch GmbH, Stuttgart, Germany

[21] Appl. No.: 09/035,789

[22] Filed: Mar. 6, 1998

[30] Foreign Application Priority Data

Mar. 7, 1997 [DE] Germany .............. 197 09 317

[51] Int. Cl.$^6$ ...................................... G06F 17/00
[52] U.S. Cl. .................. 701/1; 701/70; 701/78; 701/79

[58] Field of Search ................... 701/1, 22, 51, 701/3, 70, 79, 36; 180/197; 303/168, 173

[56] References Cited

U.S. PATENT DOCUMENTS 5,351,776  10/1994  Keller et al. .............. 701/70

*Primary Examiner*—Jacques H. Louis-Jacques
*Assistant Examiner*—Yonel Beaulieu
*Attorney, Agent, or Firm*—Walter Ottesen

[57] ABSTRACT

A method and an arrangement for controlling a vehicle includes at least one source for at least one resource and at least one consumer which consumes the resource. At least one coordinator is provided which allocates the resource to the consumer in dependence upon the capacity of the source and the resource demand of the consumer.

9 Claims, 4 Drawing Sheets

METHOD AND ARRANGEMENT FOR CONTROLLING A VEHICLE

BACKGROUND OF THE INVENTION

A method and an arrangement for controlling a vehicle are disclosed, for example, in U.S. Pat. No. 5,351,776. Here, a control of the entire vehicle or at least with respect to the drive train and brakes is suggested. This control has a hierarchial task structure for the control tasks.

The control structure described in U.S. Pat. No. 5,351,776 includes coordination elements which convert a command from a higher hierarchial level into commands for elements of a lower hierarchial level. The contents of the commands, which are transmitted from above to below in the hierarchial structure, define physical variables which determine the interfaces between the individual hierarchial levels. The described interfaces orientate themselves to the physical conditions of the movement of the vehicle and especially of the drive train and the brake.

A vehicle control which goes beyond the foregoing is not described, such as giving consideration to the chassis electronics (for example, the generator control, sun-roof drive, window lifters, et cetera). Systems in vehicle technology, which were previously independent, are becoming increasingly interconnected. For this reason, viewing only the drive train and the brakes is no longer adequate. Instead, it is necessary to provide a control structure of the entire vehicle with which also systems, which lie outside of the drive train and brake controls, can be coupled and their tasks coordinated.

SUMMARY OF THE INVENTION

The invention defines the administration and distribution of the resources available in the vehicle. Under the term "resource", energy is understood which is made available by components, so-called sources, for use by other components, so-called drains or consumers. Examples of such resources are: "mechanical energy" which is generated by the drive train (engine, clutch, transmission), by the window-washer motor, by the sun-roof motor, et cetera; "electrical energy" which is made available by the generator and the battery; and, "thermal energy" which is generated by the engine and, if required, by a latent thermal energy store.

Here, under the example of "mechanical energy", the listed components (drive train, window-washer motor and sun-roof motor) are sources of mutually independent resources which can likewise be administered independently of each other.

With the described administration and distribution of the resources, a control structure for the entire vehicle is provided which can consider other components beyond the drive train and the brakes, especially components of the chassis electronics.

Special advantages result from the solution provided by the invention because the resource administrator is capable of making decisions with respect to the resource distribution without it being necessary for the resource administrator to know specific details as to the individual consumer components. For this reason, the administrator is provided in advance with information as to the individual components with this information being as general as possible but still meaningful.

It is especially advantageous that the described resource administration makes possible a significant simplification of the analysis of the control structure in the context of the development process because the pattern for resource administration offers a modeling aid for the arrangement of the resources in the individual levels during the analysis of the control structure and the occurring communication without it being necessary to prioritize the resources with respect to use.

Furthermore, it is advantageous that the resource administration is understandable and can be integrated easily into the structure of the entire vehicle. This leads, in an advantageous manner, to a unified architecture of the entire vehicle with a freely optimizable hardware topology.

It is especially advantageous that the resource administration and resource distribution can be designed independently (development sharing) and therefore affords the possibility to reuse already tested software modules with standardized physical interfaces.

A further advantage of the solution provided by the invention is that a resource administration having coordinators on the same level as the sources and consumers as well as higher order coordinators for coupled resources makes possible an understandable total energy management with few interfaces and components which are substantially independent of each other. In this way, a good exchangeability of components is provided which can be developed and tested independently of each other because of the few defined interfaces (development sharing).

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
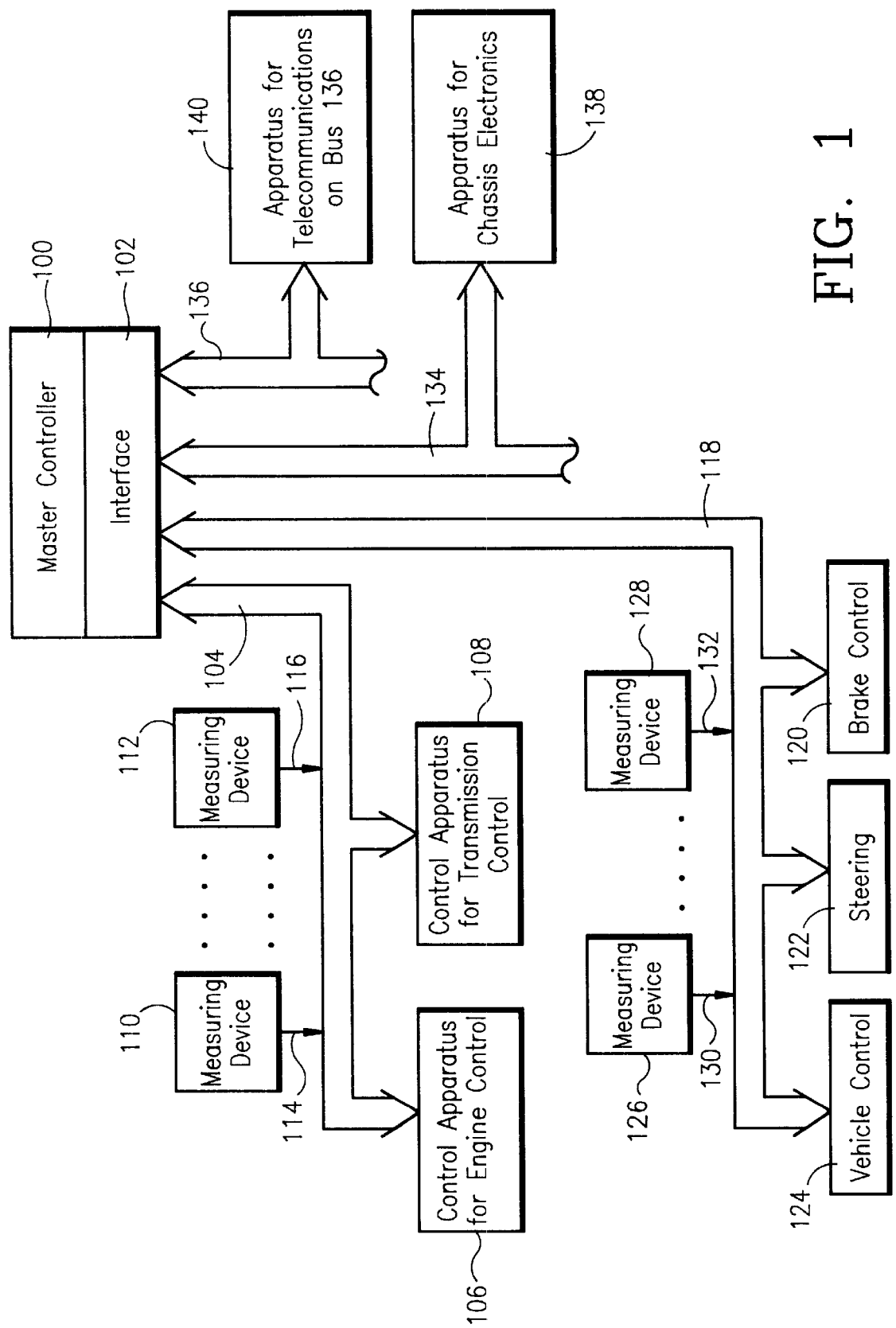
FIG. 1 is a schematic of an example of a hardware configuration of a network control system for a vehicle.

In FIG. 1, an example for a hardware configuration of a control system for a vehicle is shown in the context of a block circuit diagram. Here, reference numeral 100 identifies a so-called master controller which includes, inter alia, an interface 102 (gateway) to which various bus systems are connected. The allocation of these bus systems is exemplary.

The first bus system 104 defines the communication between the master controller 100 and the elements controlling the drive torque. The bus 104 connects the master controller 100 to a control apparatus 106 for engine control and a control apparatus 108 for transmission control.

On the other hand, the bus 104 is connected via corresponding lines 114 to 116 to respective measuring devices 110 to 112. These measuring devices detect the operating variables of the engine and/or of the vehicle such as: road speed, engine rpm, supplied air quantity or air mass, load, exhaust-gas composition, engine temperature, transmission ratio, shift state of the converter, knocking tendency, et cetera. These operating variables are to be evaluated for the control of the drive torque.

A second bus 118 connects the master controller 100 (that is, its interface 102) to elements for brake control 120, steering 122 and/or for vehicle control 124.

In the same manner as presented above, operating variables are transmitted from measuring devices 126 to 128 via respective connecting lines 130 to 132 to bus 118. These operating variables are those of the engine and/or of the vehicle such as wheel rpms, spring/shock absorber displacements, braking forces, et cetera. Furthermore, additional bus systems 134 and 136 are provided which preferably operate at different transmitting rates than the systems 104 and 118. These bus systems connect the master controller to apparatus 138 of the chassis electronics (generator, light, seat position, window lifters, sun-roof drive, et cetera) on bus 134 and, if required, to apparatus 140 for telecommunications on bus 136. The actuating elements and actuators, which are necessary to influence the engine, brake systems, et cetera, are either connected to the particular control unit or to the particular bus.

The configuration shown in FIG. 1 presents an example which can be differently configured in other embodiments, for example, by omitting the master controller 100. What is essential is that the resource administration and resource distribution (which is described below) is independent of the specific configuration of control systems on a hardware level and permits a configuration of the individual elements of the control system which is optimized with respect to space, susceptibility to faults or the like. On the other hand, the procedure provided by the invention permits a hardware configuration, which is adapted to the resource administration and resource distribution, when, for example, in specific cases of application, the sources of mechanical energy and electrical energy are controlled via respective control units while the responsible higher-order coordinator is placed in the master controller 100.

Figure 2:
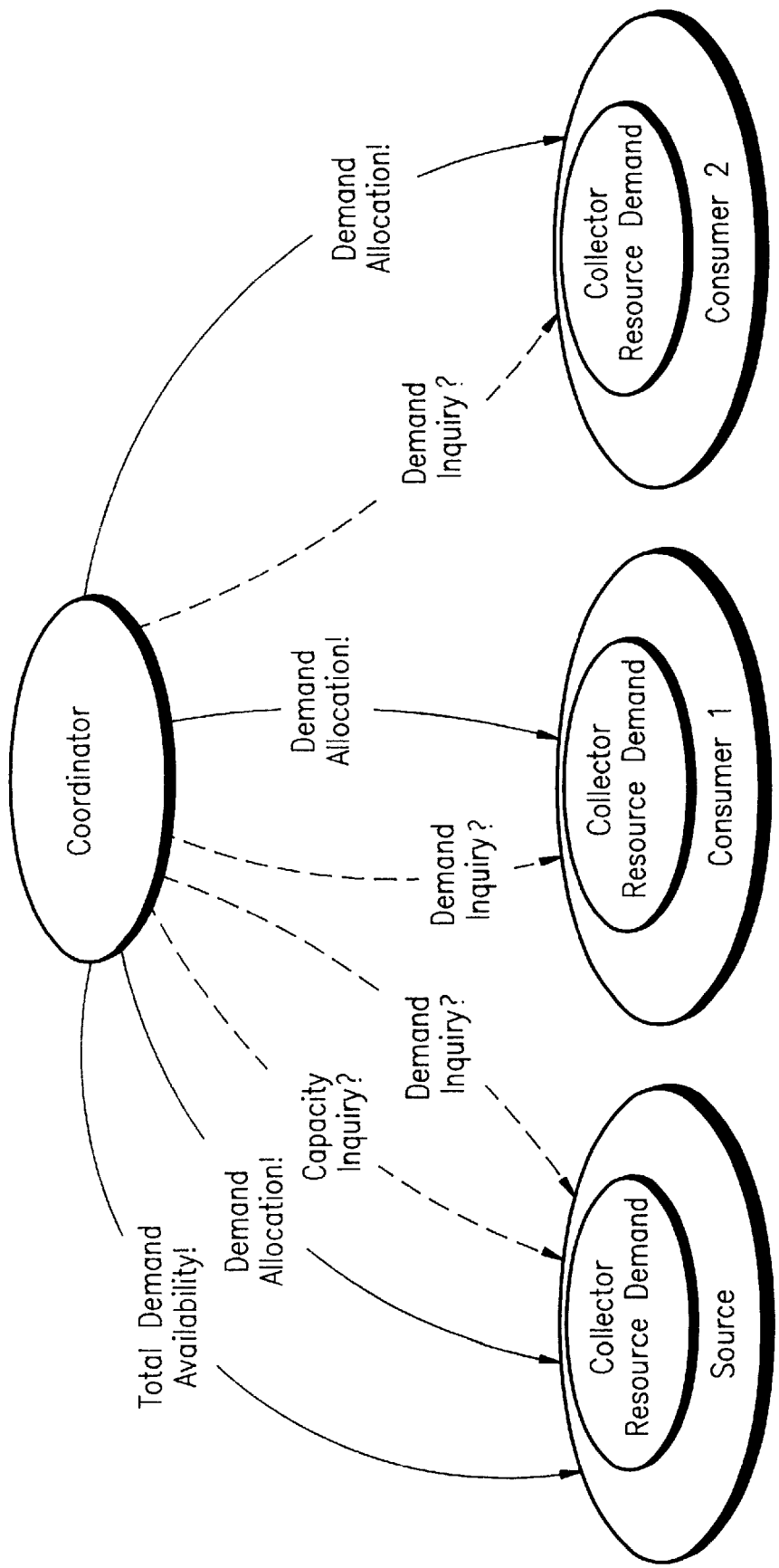
FIG. 2 shows the resource administration and resource distribution provided by the invention.

FIG. 2 shows the resource administration and resource distribution according to the invention in general form. The basic idea of the resource administration and resource distribution shown in FIG. 2 requires with respect to a resource that source and consumer are arranged within one level of the structure. The basic idea is also applied for coupled resources, that is, for resources which are used by consumers (also in different levels) and which are independent of each other. The overall coordinator is then placed at a higher order than the individual resource coordinators, that is, at least in the highest of the participating levels.

FIG. 2 shows a source as well as two consumers (consumer 1 and consumer 2) and a coordinator assigned to the source and the consumers. This coordinator assumes the resource administration and resource distribution. In the following, it is assumed that source, consumer and coordinator are disposed in one plane (detailing plane x) because the resource, which is made available by the source is used only within this plane only for the two consumers. The basic idea shown in FIG. 2 is, however, also applied when the resource, which is generated by the source, is consumed by different consumers in different levels and/or when the consumers 1 and 2 of the shown detailing level x consume further resources from another level.

The coordinator of the detailing plane shown in FIG. 2 coordinates the making available and the consumption of the resource. Each component of the corresponding detailing plane has its own collector for each resource (for example, mechanical, electrical, thermal, hydraulic, pneumatic energy, et cetera) which determines the special resource requirement of the consumers of this component and, if required, also the source of the resource. The term component does not necessarily mean a hardware component. Rather, a part of a whole is understood under the term component in the context of the general definition. Accordingly, hardware modules and/or software modules are taken together under the term component. The collectors determine in the individual consumers and, if required, in the source, which can comprise different subcomponents, the particular requirement on the resource generated by the source (for example, mechanical energy). The resource requirement of the individual components is determined in several different prioritized component quantities so that the particular resource requirement is present for each individual component of the corresponding consumer or the source. These individual subquantities are prioritized differently in dependence upon their importance and are summed for determining the resource requirement of the components.

The coordinator inquires of each component (consumer and source) of the detailing plane its resource requirement or receives these values from the components (requirement inquiry or request relationship). The coordinator further asks the sources of the resource as to the available potential, that is, the maximum quantity of the resource which can be generated by the source or receives corresponding values from the source (potential inquiry). In a preferred embodiment, and under the term "available potential", it is not an individual value which is understood but several values. These values are provided with quality features. The quality features provide the coordinator with additional data for the decision as to the distribution of the resource because they state something as to the character of the availability. Possible quality features are, for example, "optimal", "acceptable" or "maximal". Thus, the internal combustion engine determines an available potential with the quality "optimal" for consumer optimal control or an available potential having the quality "maximum" for a control to maximum energy.

The coordinator distributes the available potential of the sources in correspondence to the resource requirement of the individual components prioritized as to the importance of the consumer and/or the nature of the need. A conflict is present when the summed resource requirement of the consumers (and, if required, the source) exceeds the potential of the sources. In this case, the coordinator limits the resource amounts available to each component of the plane x for consumption in correspondence to the priorities and a strategy fixed in the specification. The decision strategy is stored in the coordinator and can be varied depending upon the situation or the type of driver.

The coordinator assigns the components of the detailing plane x a consumption of the resource (limited as may be required) and directs the sources of the resources to make available the sum of the assigned resources (total requirement availability). Each component distributes the resources, which are allocated by the coordinator, to its individual components. This distribution is in correspondence to priorities and the strategy pregiven in the specification.

The collection and allocation of the resource of a resource, which is available only locally within a component, can be repeated with the same procedure in different detailing levels for refining a component.

The pattern for the administration and distribution of a resource is independent of the nature of the resource. Each resource requires its own coordinator which distributes tasks in the context of the resource administration and resource distribution to the sources and consumers.

A higher-order coordinator is necessary for the administration of coupled resources. The higher-order coordinator intervenes only on the coordinators of the respective resources via commands and realizes the strategies stored in the higher-order coordinator. For the sequences for the coordinated administration of coupled resources, one proceeds, in each case, from the mutual physical dependencies of the resources. Nothing is changed on the principle strategy with respect to resource administration. However, the logically sequenced communication for resource administration is interrupted at different locations, which orientate themselves to the physical dependencies, and is transmitted further correspondingly interconnected. Accordingly, and for example in a case after the requirement and potential inquiry of a coordinator, the requirement allocation can only then take place when a requirement allocation from a higher level has taken place. In this way, a flexible adaptability of the resource administration and resource distribution results to the particular system for simultaneously clearly limited change complexity. Coupled resources are resources which cannot be administered independently of each other. An example here is the coupling between the resource mechanical energy, which is made available by the source "engine", "clutch" and "transmission", and a resource electrical energy which is made available by the generator and the battery of the vehicle. For making available the electrical energy, the generator requires a mechanical energy which is produced by the engine. With respect to the requirement and potential inquiries as well as the requirement allocation, the coordinator of the source for the mechanical energy has to consider the commands from the higher-order coordinator which collects the requirements of the source for the electrical energy.

The described resource administration and resource distribution satisfies the increasing requirements of the automobile market for greatly increasing functionality, lower development cost and shorter innovation cycles. The greatly increasing functionality becomes evident in the ever more complex coupling functions wherein previously autarch components are integratively utilized. As examples, the coupling functions listed in Table 1 are noted.

TABLE 1

Coupling Functions and Components to be coordinated

| Coupling Function | Components to be Coordinated |
|---|---|
| Travel Dynamic Control | Brake, Engine, Transmission, Differential, Chassis, Steering |
| Distance Control | Engine, Transmission, Brake |
| Drive Train Control | Engine, Clutchm Transmission |
| On-Board Network Managment | Engine, Generator, Battery |
| Interior Climate Control | Climate Control, Engine, Latent Heat Store, Recirculation Flap |
| Use Inhibitor | Engine, Transmission, Steering |
| Illumination Distance Control | Headlights, Steering, Chassis |
| Pre-Crash Sensing | Distance Control, Belt Tightener, Air Bag, Rollover Bar |
| Et cetera | |

To realize the coupling functions, the components are combined to form function groups and are organized in hierarchial levels such as in the example of the drive train and the brakes in the state of the art mentioned initially herein. The arrangement of the components within the hierarchy is of decisive significance for the overview of the structure of the total vehicle.

Various resources are available in the motor vehicle which are generated by different sources. Examples for resources and sources are presented in Table 2.

TABLE 2

Examples for Resources and Sources

| Resource | Source |
|---|---|
| Mechanical Energy 1 | Engine, Clutch, Transmission |
| Mechanical Energy 2 | Windshield Wiper Motor |
| Mechanical Energy 3 | Slide-Roof Motor |
| Electrical Energy 1 | Generator, Battery |
| Electrical Energy 2 | Battery, Ignition Key |
| Thermal Energy 1 | Engine, Latent Heat Store |
| Thermal Energy 2 | Stationary Heater |
| Hydraulic Energy | |
| Pneumatic Energy | Compressed Air Store, Compressor |
| Chemical Energy | Fuel Tank |
| Et cetera | |

The source of a resource and its consumers are modeled in the hierarchy always only as high as necessary and as low as possible (that is, shown in the context of a hierarchial structure as may be required). This necessity results from the tasks of the components. The lowest possible arrangement of the components in the hierarchy ensures a good exchangeability of the components.

If several components access one or more sources of a resource as consumers, then the sources are to be modeled in the detailing level in which the tasks, which lead to resource use, are coordinated. A coordinator for administering and distributing the resource is likewise modeled in this plane. The sources can then be further detailed in lower detailing levels. For the case wherein several sources are available for making the resources operationally ready, the coordinator has the task of coordinating the consumers as well as the task of administering the sources with respect to a common potential of the resource.

The selection of a detailing level is based on view points such as: the arrangement of the command generator for the component in the hierarchy; whether the component can fulfill its tasks in an autarch manner or requires external coordinators; which data are required for the issuance of the commands; where the commands of the component are coordinated; et cetera.

An example for the administration and distribution of coupled resources is an optimization as to the resource mechanical energy (engine, clutch, transmission) and electric energy (generator, battery). This optimization can be explained when viewed in the following scenario. A conflict is present wherein the consumers of the mechanical energy demand 100% of the maximum energy. The generator as a consumer of mechanical energy generates an electrical energy in correspondence to its efficiency and the generator makes this electric energy available to the consumers of the electric energy. Now, a further consumer is switched in for electric energy. The electric energy, which is needed by this consumer, cannot be taken from the battery. In the context of a higher-order optimization, either other electrical consumers or even consumers of mechanical energy are switched off. For the case that consumers of mechanical energy are switched off, the generator has available a higher mechanical energy for generating a higher electrical energy.

Figure 3:
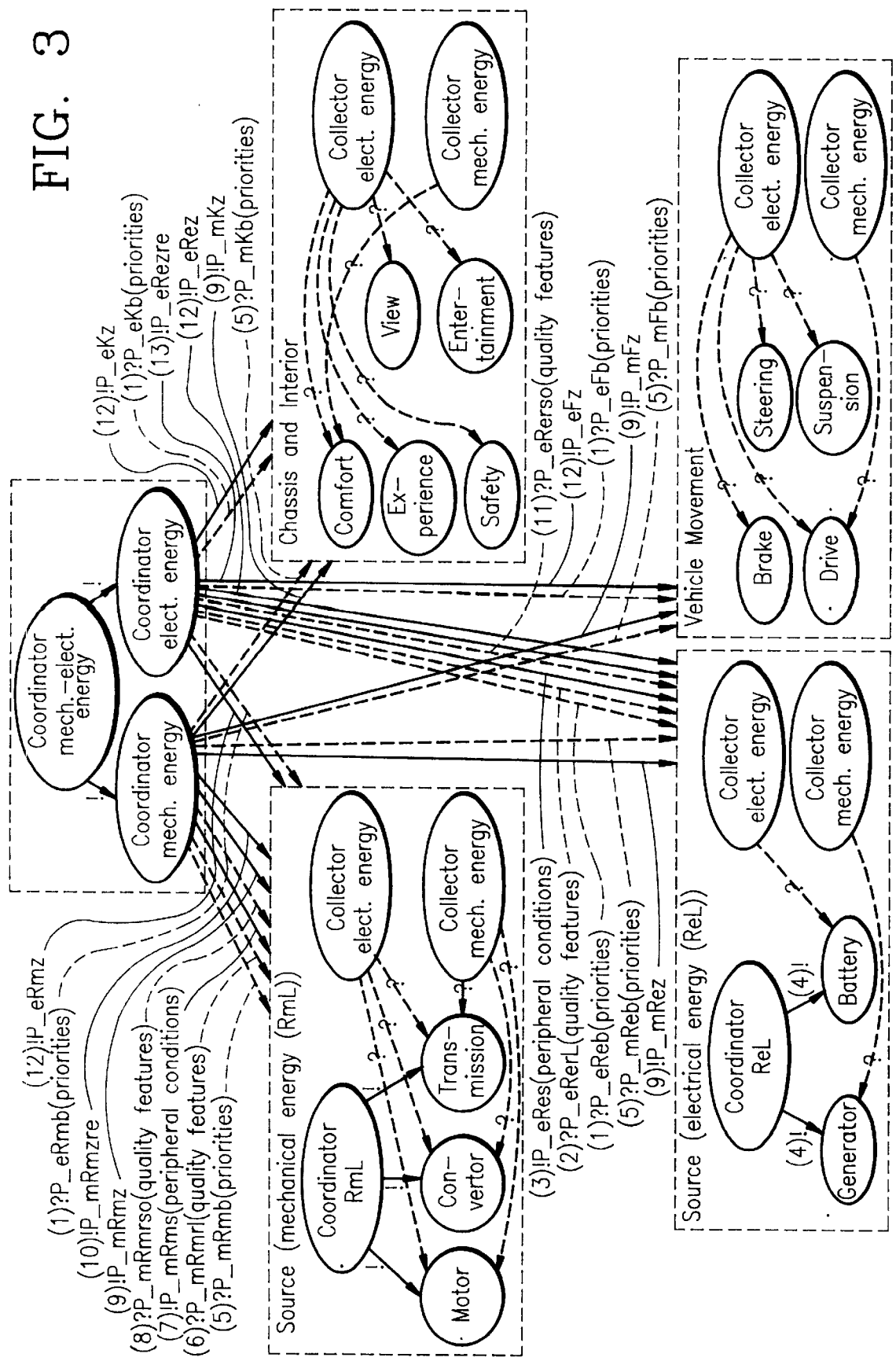
FIG. 3 shows a preferred embodiment of the administration and distribution of mechanical and electrical energy; and, FIG. 4 is an example of an interaction diagram which defines the communication between the components for the embodiment shown in FIG. 3.
Figure 4:
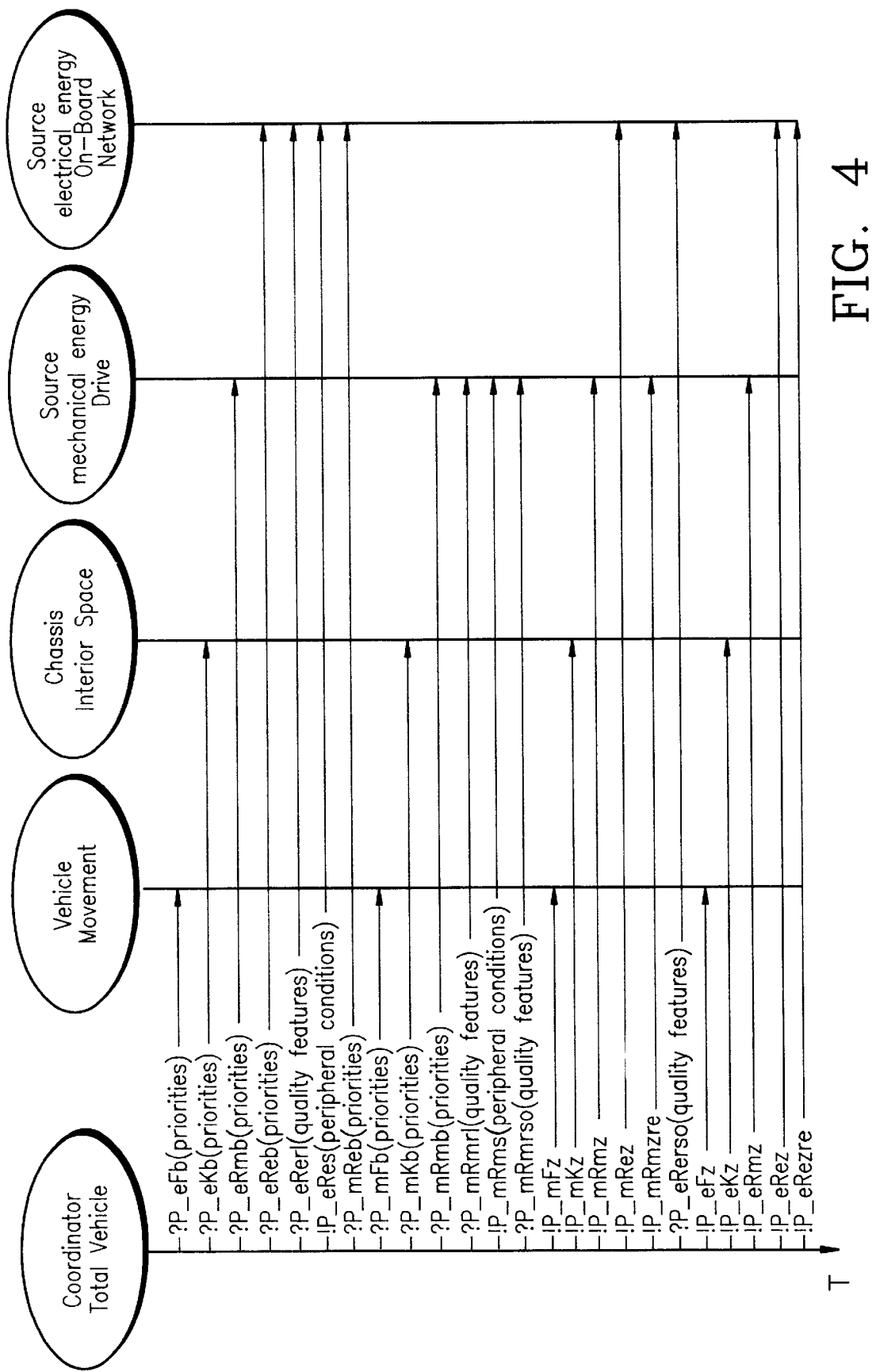

In FIGS. 3 and 4, the administration and distribution of coupled resources is described with respect to a specific embodiment. FIG. 3 shows the structure whereas FIG. 4 shows the logic sequence of the occurring communication.

In an upper detailing level, FIG. 3 shows an entire vehicle coordinator and, in a lower plane, the source "mechanical energy RmL" and the "source electrical energy ReL".

Furthermore, components and consumers of the vehicle movement are shown not further structured as well as of the chassis and the interior. The entire vehicle coordinator, which is shown in a high detailing level, includes a coordinator for the mechanical energy and a coordinator for the electrical energy. A further coordinator for coordinating the two resources is at a higher level. Correspondingly, the source "mechanical energy RmL" exhibits a coordinator RmL for the source "mechanical energy" as well as collectors for the electrical and mechanical energy. In the example shown, the source "mechanical energy" comprises engine, converter and transmission. Correspondingly, the source "electric energy ReL" has a coordinator ReL as well as collectors for the electric and mechanical energy. The source "electrical energy" comprises generator and battery in the embodiment shown. In further detailing levels (not shown for reasons of clarity), the sources and components can be structured further while considering the basic principles presented above. Data and tasks are exchanged between the individual elements. The data channels are shown with broken lines and a question mark; whereas, the solid-line arrows are provided with exclamation signs and show the command channels.

In FIG. 4, the time-dependent relationship of the data and command transmission is shown. Here, the time is plotted from above to below; whereas, the particular action is shown horizontally. The actions are carried out sequentially.

The operation of the resource administration and resource distribution in a preferred embodiment is described in the following with respect to FIGS. 3 and 4.

With the aid of the collector, each component collects for the particular resource the future demand or requirement of the consumers contained therein. The requirement numbers for the particular resource are computed in the components based on the actual state of the component and/or on a future state pregiven, for example, by the driver command and are prioritized in accordance with importance and collected (summed) in the particular collector. For example, the requirement for mechanical energy of the engine is computed from the torque corresponding to the changing driver command. The requirement as to electrical energy is, for example, determined from the current requirement or energy requirement to be expected when switching on the illumination.

The coordinator for the electric energy resource in the total vehicle coordinator inquires of the components (vehicle movement, chassis, interior space and all sources) as to the electric energy required by these components (inquiries P_eFb(priorities), P_eKb(priorities), P_eRmb(priorities), P_eReb(priorities), see FIGS. 3 and 4). With respect to the electrical energy, the electric energy source itself appears as consumer (for example, via electric battery heating, charging of the battery, et cetera).

The coordination of electric energy takes place centrally via the electric energy coordinator in the total vehicle coordinator. This means that the battery cannot directly request energy from the generator because this would imply a prioritization of the battery with respect to all other electrical consumers which is not purposeful in all operating states. This is shown by the following scenario. The battery is almost empty and the vehicle has a brake system wherein the brake is applied electrically. For the case that the battery would directly request its requirement from the generator, it would not be possible to brake the vehicle because the entire generator energy would be needed for charging the battery. However, in the structure shown, the battery is not charged because of a decision of a coordinator of a higher detailing level. This is so because the instantaneous energy of the generator is needed for the brakes to decelerate the vehicle. This decision can only be made at a higher level because the coordinator ReL does not know where the specific requirement with respect to electric energy comes from.

The charging state of the battery is to be monitored in the electric energy source. The electric energy requirement is prioritized in the collector of the electrical energy in the source ReL. In this way, the electric energy coordinator in the coordinator of the entire vehicle can draw a conclusion as to the charging state of the battery. The energy requirement having a high priority corresponds to a poor loading state of the battery.

Each component and source announces the resource requirement of electrical energy to the electric energy coordinator in the total vehicle coordinator in such a manner that, with an energy requirement, the priority thereof is also supplied. For the case, for example, that three priorities are outputted by each component, each component announces a maximum of three energy requests. These values have been determined by the internal energy collector previously within the components and have correspondingly been summed up in accordance with priorities.

In a second step, the electric energy coordinator in the total vehicle coordinator requests at the source for the electric energy resource the realizable electric energy (request P_eRerl(quality features)). The source of the electric energy resource then advises the electric energy coordinator in the total vehicle coordinator of the realizable energy.

The electric energy coordinator does not yet consider that a request with respect to the mechanical energy results from the making available of the electric energy by the generator. This is purposeful in the context that, for example, the generator is driven by its own internal combustion engine and thus announces no requirement with respect to the mechanical energy of the engine which is primarily for propulsion.

An individual value is not intended with respect to realizable electric energy. Rather, this includes several values. The realizable electric energy is provided with quality features. For example, three quality classes "optimal", "acceptable" and "maximum" exist for the electric energy. Here, "optimal" represents, for example, economical or ecological optimization. A corresponding allocation results for the two remaining quality features under view points such as temperature of the battery, efficiency of the generator, et cetera. The actual number of the features as well as their effect are determined for the particular application.

The electric energy coordinator attempts to cover the entire electrical energy demand from the generator. The battery defines a buffer to the electric energy. However, the maximum realizable electric energy results from the combination of the generator and the battery.

On the basis of the classification of realizable energies, the total vehicle coordinator (coordinator of mechanical and electrical energy) can realize different strategies via the coordinators for the resources depending upon situation, for example, optimal energy management, reduction of the fuel consumption, increase of total comfort, et cetera. This can, for example, take place via an input of a maximum amount of the resources in selected operating states (for example, the least possible minimal mechanical energy).

If the value of the realizable electric energy is lower than the sum required by the components (consumers), then the electric energy coordinator in the total vehicle coordinator must decide, on the basis of priorities, which energy amounts are to be made available to which components.

In a third step, the electric energy coordinator in the total vehicle coordinator requests that the source of the resource of electric energy makes available the steady-state required energies for the consumers (request P_eRes(peripheral condition)). The request is here provided with peripheral conditions. These conditions relate, for example, to the desired dynamic of availability because this must correspond to the characteristic of the load to be connected.

Thereafter, the coordinator ReL determines how the electric energy is made available via the generator and/or the battery. If the generator participates in the preparation of energy, then the generator announces a requirement as to mechanical energy to the internal collector for the mechanical energy in the source ReL. The request of the generator for electric energy initiates the administration and coordination of the mechanical energy by the mechanical energy coordinator in the total vehicle coordinator.

The total vehicle coordinator inquires of the components as to their requested mechanical energy (inquiries P_mReb (priorities), P_mFb(priorities), P_mKb(priorities), P_mRmb(priorities)). With respect to the mechanical energy, the mechanical energy source itself appears also as consumer (engine ancillary equipment, such as water pump, oil pump, et cetera). The coordination of the mechanical energy resource should take place centrally via the coordinator mechanical energy in the total vehicle coordinator.

The engine ancillary equipment cannot directly request mechanical energy from the engine. This would correspond to a prioritization of the engine ancillary equipment with respect to all other mechanical consumers. A coordination of the engine ancillary equipment is, however, only possible if this equipment can be switched, that is, if this equipment is driven stepwise or continuously. Switchable engine ancillary equipment is, however, not yet conventional in present-day vehicles.

That the view of the consumption aspect of the engine ancillary apparatus is purposeful with respect to mechanical energy will be shown in a scenario wherein an engine ancillary apparatus, such as the water pump, is driven only at part load. Then, the remaining mechanical energy can be made available to the generator for charging an almost empty battery. This procedure is only possible because of a decision of a coordinator of a higher detailing level and increases the variation possibilities and therefore the integration of new functions into the total vehicle system. The above decision can only be made at a higher level because the coordinator RmL does not know from where the request with respect to the mechanical energy comes. For the case that the engine ancillary apparatus would bring its request directly to the engine and then also would take mechanical energy without further coordination, it would no longer be possible in the scenario discussed to charge the battery from an exhausted mechanical energy resource. The total engine energy would, for example, be necessary for the propulsion and the engine ancillary equipment. For charging the battery, the mechanical energy coordinator would then have to reduce the mechanical energy which is made available for the propulsion and allocate this mechanical energy, which has become available, to the source ReL and therefore to the generator.

The engine state (for example, supply with lubricating means and cooling means) is to be monitored by the mechanical energy coordinator in the total vehicle coordinator based on abstract data. The mechanical energy coordinator in the total vehicle coordinator can draw a conclusion as to the engine state via the prioritization of the mechanical energy requirement of the engine ancillary apparatus via the mechanical energy collector in the mechanical energy source. An energy requirement having a high priority corresponds to a poor engine state.

Each component and source announces its mechanical energy resource requirement to the mechanical energy coordinator in the total vehicle coordinator in such a manner that, in addition to the resource request, also the priority thereof is supplied. For the case that, for example, three priorities can be assigned by each component, then each component announces a maximum of three energy requests. These values have previously been determined within the components by the internal mechanical energy collectors, have been correspondingly prioritized and summed in accordance with the priorities.

The coordinator for the mechanical energy in the total vehicle coordinator inquires as to the realizable mechanical energy (inquiry P_mRmrl(quality features)) at the source RmL. The source RmL then advises the mechanical energy coordinator in the total vehicle coordinator as to the realizable energy. With respect to the realizable mechanical energy, it is to be understood that this is not an individual value. Rather, several values are included. The realizable mechanical energy is provided with quality features. For example, it is intended that three quality classes, namely, "optimal", "acceptable" and "maximum" exist for the mechanical energy. Here, "optimal" for example represents economical, ecological optimization or an energy availability without a switching operation. A corresponding allocation results for the two remaining quality attributes while considering view points such as engine noise, efficiency of the engine, et cetera. The actual number of attributes as well as their contents are determined for the particular application.

On the basis of the classified realizable energy, the total vehicle coordinator (coordinator of mechanical and electrical energy) then realizes different strategies via the coordination for the resources depending upon the situation. Hereby are understood, for example, an optimal energy management, a reduction of fuel consumption, an increase of total comfort, et cetera. If the value of the realizable mechanical energy is less than the sum, which is requested by the components (consumers), then the mechanical energy coordinator in the total vehicle coordinator must decide based on the priorities as to which energy amounts are to be made available to which components.

Thereafter, the mechanical energy coordinator in the total vehicle coordinator requests the source RmL to make the steady-state requested energies available to the consumers (request P_mRms(peripheral conditions)). The request is provided with peripheral conditions. These peripheral conditions relate, for example, to the desired dynamic of the availability because this dynamic must correspond to the characteristic of the switched-in load.

The source RmL provides data to the mechanical energy coordinator in the total vehicle coordinator as to which energy is immediately realizable (inquiry P_mRmrso (quality attributes)). The realizable mechanical energy is also to be provided with the selected quality attributes. Accordingly, and in the selected example, three mechanical energies are returned having the respective quality attributes "optimal", "acceptable" and "maximum". Here, a deviation from the steady-state value, which was previously requested, possibly exists as a consequence of inadequate engine dynamic. For this reason, only the steady-state mechanical energy was discussed above. If the source RmL detects that the requested mechanical energy cannot be made available with the required peripheral conditions (dynamic, et cetera), then the source RmL takes measures which make this possible at a later time point (lead function, exhaust-gas return, charge pressure control, et cetera).

The mechanical energy coordinator in the total vehicle coordinator allocates to the components and sources the energy amounts which are immediately available thereto (requests P__mFz, P__mKz, P__mRmz, P__mRez). The allocation of the mechanical energy has the consequence with respect to the components and sources that the corresponding coordinators, according to previously fixed strategies, distribute the allocated mechanical energy to the consumers which have announced a prioritized request to the internal collector.

The mechanical energy coordinator in the total vehicle coordinator directs the source RmL (there, the coordinator), to immediately make available the sum of the allocated mechanical energies and to prepare those energies which were otherwise requested (command P__mRmzre).

After the allocation of the mechanical energy, which was requested by the source ReL for the generator, the source ReL can answer the inquiry of the electric energy coordinator in the total vehicle coordinator with respect to the realizable energy. The source ReL provides the data to the electric energy coordinator in the total vehicle coordinator which electric energy can be realized immediately (inquiry P__eRerso(quality attributes)). The realizable electric energy too is to be provided with selected quality attributes. In this way, in the selected example, three electric energies were returned having the quality attributes "optimal", "acceptable" and "maximum". Here, possibly a deviation from the previously requested steady-state value exists because of an inadequate dynamic of the generator and the battery. For this reason, only the steady-state electric energy was discussed previously. If the source ReL detects that the requested electric energy cannot be made available with the required peripheral conditions (dynamic, et cetera), the source takes measures which make this possible at a later time point (excitation current, excess excitation, et cetera).

The electric energy coordinator in the total vehicle coordinator allocates to the components the electric energy amounts, which are immediately available to them, (requests P__eFz, P__eKz, P__eRmz, P__eRez). The allocation of the electric energy has the consequence for the components and sources that the corresponding coordinators distribute, according to previously fixed strategies, the allocated electric energy to the consumers which previously announced a prioritized request or demand to the internal collector.

The electric energy coordinator in the total vehicle coordinator requests the source ReL (there the coordinator) to realize the sum of the allocated electric energies immediately and to prepare those energies which are otherwise requested (command P__eRezre).

It is understood that the foregoing description is that of the preferred embodiments of the invention and that various changes and modifications may be made thereto without departing from the spirit and scope of the invention as defined in the appended claims.

What is claimed is:

1. A method for controlling a vehicle which includes at least one source for at least one resource and consumers for said resource, and at least one coordinator for controlling said source, the method wherein said coordinator programmed to perform the following steps to control said source:

inquiring as to the demand of said consumers on said at least one resource;

inquiring as to the maximum capacity of said resource which is generated by said source for said resource;

driving said source for said resource for making a total demand allocation of said consumers available in the context of the maximum capacity of said resource; and, allocating the resource capacity generated by said source to said consumers in correspondence to the demand thereof.

2. The method of claim 1, wherein a coordinator is provided for each resource.

3. The method of claim 2, wherein the consumer advises the coordinator of the demand which said consumer makes on the coordinated resource.

4. The method of claim 3, wherein the source advises the coordinator of the capacity of the resource.

5. The method of claim 4, wherein the coordinator allocates the resources to the consumers and to the source while taking into account the capacity of the resource.

6. The method of claim 5, wherein the coordinator causes the source to make available the resource in the context of the entire demand.

7. The method of claim 6, wherein higher order coordinators are provided for the administration and distribution of coupled resources.

8. The method of claim 7, wherein consumers and sources advise higher-order coordinators of the demand on the particular resource.

9. An arrangement for controlling a vehicle which includes at least one source for at least one resource and consumers for said resource, and at least one coordinator for controlling said source, the arrangement comprising:

said coordinator programmed to perform the following steps to control said source;

inquiring as to the demand of said consumers on said at least one resource;

inquiring as to the maximum capacity of said resource which is generated by said source for said resource;

driving said source for said resource for making a total demand allocation of said consumers available in the context of the maximum capacity of said resource; and, allocating the resource capacity generated by said source to said consumers in correspondence to the demand thereof.

* * * * *

UNITED STATES PATENT AND TRADEMARK OFFICE
CERTIFICATE OF CORRECTION

PATENT NO.    : 5,991,669
DATED         : November 23, 1999
INVENTOR(S)   : Peter Dominke, Holger Bellmann, Jens-Olaf Mueller, Torsten Bertram, Asmus Volkart, Christian Grosse and Wolfgang Hermsen It is certified that error appears in the above-identified patent and that said Letters Patent is hereby corrected as shown below:

Column 5,
Table 1, second column, fourth line, delete "Clutchm" and substitute -- Clutch, -- therefor.
Table 1, first column, fourth line, delete "On-Board Network Managment" and substitute -- On-Board Network Management -- therefor.

Column 6,
Table 2, second column 2, line 8, add "Hydraulic Store, Hydraulic Pump --.

Column 12,
Line 9, between "coordinator" and "pro-", insert -- is --.
Line 47, delete "source;" and substitute -- source: -- therefor.

Signed and Sealed this

Second Day of April, 2002

Attest:

Attesting Officer

JAMES E. ROGAN
Director of the United States Patent and Trademark Office